Dec. 4, 1934.  I. P. RODMAN  1,983,402
PRODUCTION OF MOTION PICTURES IN NATURAL COLORS
Original Filed April 24, 1931  2 Sheets-Sheet 1
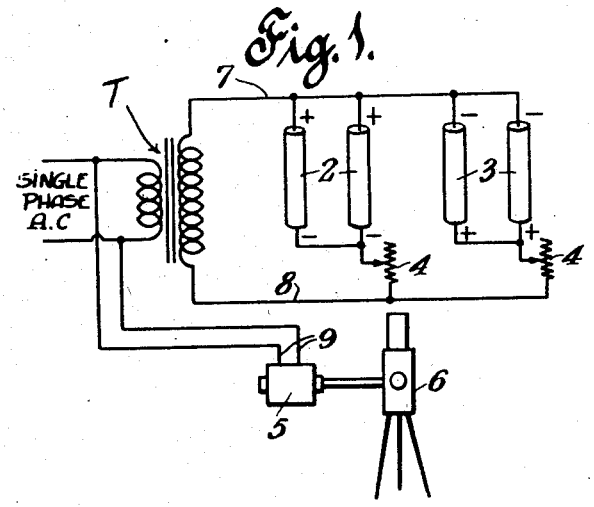
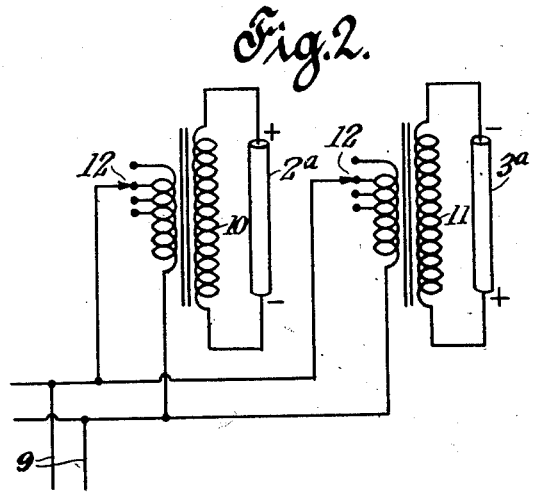
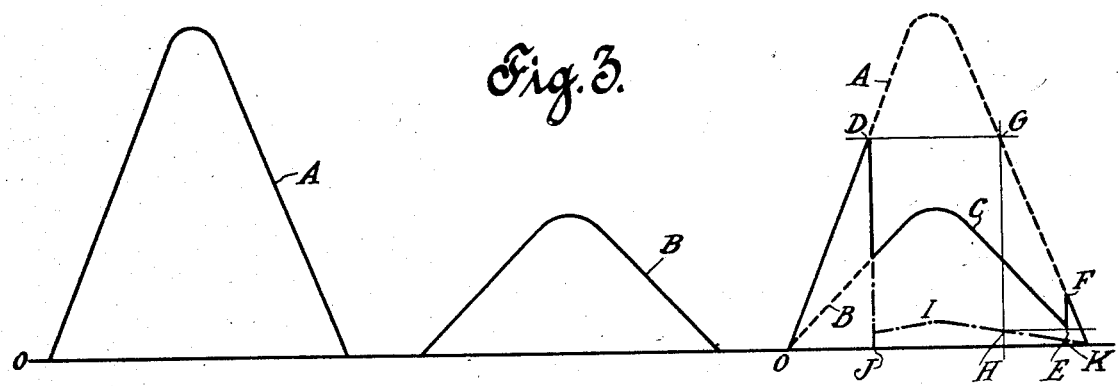
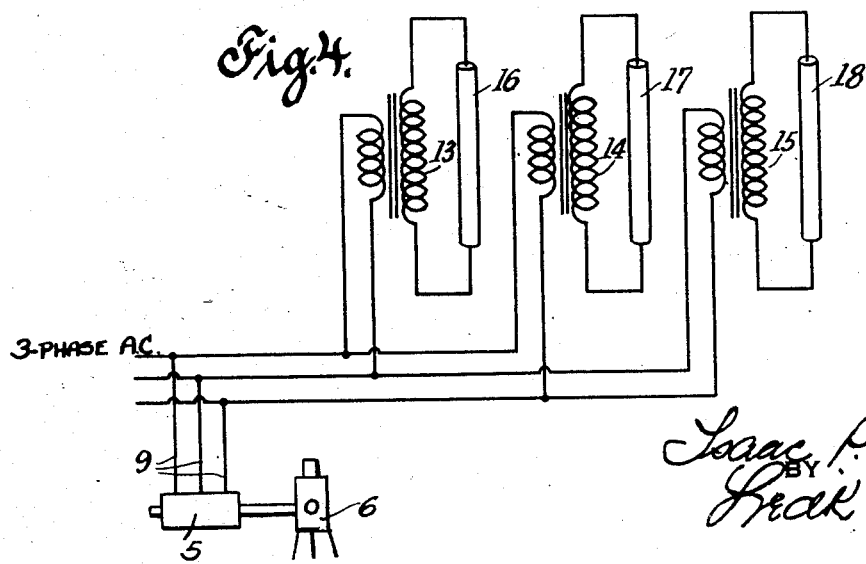
INVENTOR
Isaac P. Rodman
BY
Fred C. Fischer
ATTORNEY Dec. 4, 1934.  I. P. RODMAN  1,983,402
PRODUCTION OF MOTION PICTURES IN NATURAL COLORS
Original Filed April 24, 1931  2 Sheets-Sheet 2
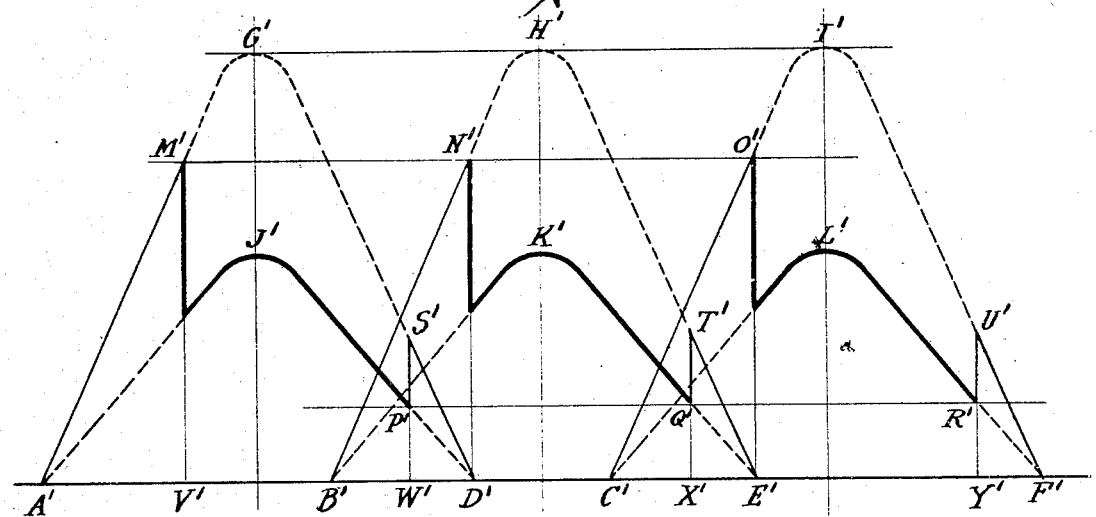
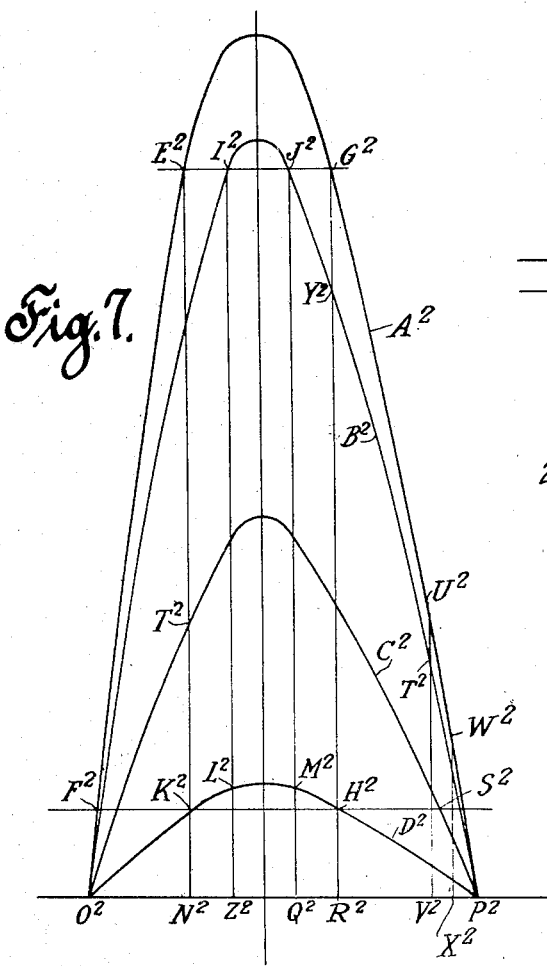
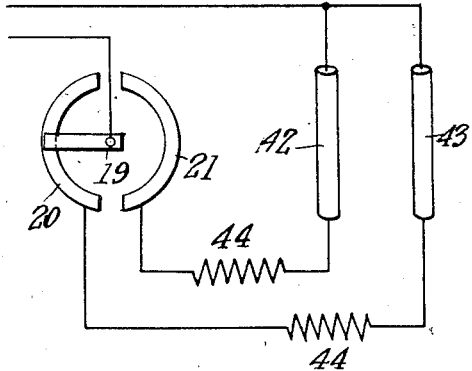

Patented Dec. 4, 1934

1,983,402

UNITED STATES PATENT OFFICE 1,983,402

PRODUCTION OF MOTION PICTURES IN NATURAL COLORS

Isaac P. Rodman, South Orange, N. J., assignor to Lektophone Corporation, Jersey City, N. J., a corporation of Delaware Application April 24, 1931, Serial No. 532,419
Renewed April 25, 1934

6 Claims. (Cl. 88—16.4)

This invention relates to color photography and more particularly to means for producing motion pictures in natural colors.

Heretofore, in producing motion pictures in color, the animated objects have been photographed through color filters which are objectionable in that they absorb unequal quantities of light and prevent faithful reproduction; or the objects are photographed directly to produce a black and white film which is later tinted to give color effects. Obviously, such methods are not capable of producing the natural color effects desired.

In accordance with my invention the animated objects are illuminated directly by lights of different colors, the intensities of which may be conveniently regulated, the lights being actuated in a predetermined sequence and in timed relation with the shutter of a motion picture camera.

It is an object of this invention to provide means for synchronizing the actuation of a plurality of colored lights in sequence with a shutter of a motion picture camera.

It is a further object to produce colored motion pictures which are free from defects due to fringing and striping.

These and other advantageous objects, which will later appear, are accomplished by the simple and practical construction and arrangement of parts hereinafter described and exhibited in the accompanying drawings, forming part hereof, and in which:

Figure 1 represents a diagram showing adaptation of the invention for use with single phase alternating current.

Figure 2 diagrammatically shows a modified arrangement for use with single phase alternating current.

Figure 3 graphically shows time and voltage characteristics of a lamp as when used with single phase alternating current.

Figure 4 diagrammatically shows the invention employed in connection with three phase current.

Figure 5 graphically shows the phase relations between three lamps operating on three phase current.

Figure 6 shows diagrammatically a mechanical arrangement for actuating two lamps in sequence.

Figure 7 graphically shows time relations and intensities which may be adjusted in connection with an alternating current.

In the embodiment shown in Figure 1 in which two sets of colored lights are used, single phase alternating current is used. The primary of power transformer T is connected to a single phase alternating current source. One side of the secondary of transformer T is connected by means of conductor 7 to the positive terminal of one group of lights 2 and the negative terminal of the other group of lights 3. The other side of the secondary of transformer T is connected to the adjustable resistances 4 by means of conductor 8. One resistance 4 is connected to the negative terminal of lights 2 and the other resistance 4 is connected to the positive terminal of lights 3.

Lights 2—2 and 3—3 are self-rectifying and therefore for each complete cycle lights 2 and 3 will be energized in succession. That is, when conductor 7 is positive, lights 2 will be energized, and when conductor 8 is positive, lights 3 will be energized.

In case non-rectifying lights are used, suitable rectifiers may be inserted between resistances 4 and the respective lights. The resistances 4 may be adjusted to alter the intensity of the respective groups of lights to the values required for proper exposures. Each group of lights may consist of one or more lights to meet the required illumination conditions.

The source of power is connected by conductors 9 to a synchronous motor 5, which operates in timed relation a motion picture camera 6.

In Figure 2 is also shown two colored lights operating in connection with a single phase alternating current. Lights 2a and 3a, which may be either self-rectifying or provided with suitable rectifiers, are connected to the secondaries of transformers 10 and 11 respectively, the polarity of the connections being so arranged that the lights will be successively energized for one-half cycle. The primaries of the transformers 10 and 11 may be provided with taps 12 to adjust the intensity of the lights.

By means of conductors 9 a synchronous motor may be connected to the same source of alternating current. This motor may be used to drive a camera or any other device with which it is desired to synchronize the lights. It should be noted that as many lights as desired can be connected to the power mains.

In Figure 3 is shown diagrammatically the voltage wave form of the transformer T of Figure 1 and transformers 10 or 11 of Figure 2. It was not found practicable to draw these figures as sine waves to scale, so a form has been arbitrarily chosen which more clearly sets forth the principles. Curve A represents the voltage at the secondary of the transformer with no load. Curve B represents the voltage at the secondary with load connected. Curve C represents the voltage at the secondary when connected to a gas arc light. It will be noted that the voltage follows curve A to the point D which represents the striking point of the arc; it then drops to curve B and follows curve B to the point E at which point the arc goes out. It then rises again to curve A at point F which is not high enough in value to cause the arc to strike, which it follows to zero.

The values will depend upon the gas used, the gas pressure, the temperature and the distance between the electrodes. A transformer with a low magnetic coupling or a high resistance secondary winding or a combination of these two characteristics will fulfill the requirement. It is obvious that it is necessary for the open circuit peak voltage to rise above the value required to start the arc and that the loaded voltage must be high enough to maintain the arc until it is desired that it go out. It is also obvious that if self-rectifying lights are used the light flashes will have the same frequency as the alternating current source and a duration somewhat less than the time of one-half cycle.

If two oppositely poled lights are connected to the same transformer they need not be completely self-rectifying providing each light requires a slightly higher voltage to strike in one polarity than in the other and if they both require substantially the same striking voltage in the proper respective polarity.

The insertion of an external resistance between the light and the transformer will have no effect upon the starting point, but will reduce the candlepower of the light and shorten the duration of the flash, because the load voltage will be reduced and fall below point E sooner.

It is not desirable to introduce a resistance high enough to cause the voltage to fall to the level of point E on or before the point H which is the intersection of the voltage line EH and the time line GH as the light will strike again in an oscillatory manner. Curve I represents the limit to which the efficiency may be reduced. The range of adjustment is from curve I to curve C.

If adjustment is made by tapping the primary of the transformer, the result is nearly the same. The limiting factor is that the open circuit voltage must not be reduced below the value necessary to strike the arc.

The embodiment in Figure 4 shows three sets of colored lights 16, 17 and 18, which are connected to the secondaries of transformers 13, 14 and 15, respectively. The primaries of the transformers are connected to a source of three phase alternating current. Primary of transformer 13 is connected to one phase; primary of transformer 14 to a second phase, and primary of transformer 15 to the remaining phase. A three phase synchronous motor is connected to the same source of power by conductors 9. The motor may be coupled to any device which it is desired to synchronize with the lights; for example, a motion picture camera.

Adjustable resistances may be used between the transformers and the lights of the transformer windings may be tapped or a combination of both may be used.

The lights should be self-rectifying or provided with suitable rectifiers and should be connected in such a polarity that they will be energized successively each by its respective phase.

In Figure 5 is shown diagrammatically the voltage wave form of the three phase system as shown in Figure 4. It was not found practicable to draw these figures as sine waves to scale, so a form has been arbitrarily chosen which more clearly sets forth the principles.

Curve A'G'D' represents the open circuit voltage of the secondary of the transformer connected to phase 1.

Curve B'H'E' represents the open circuit voltage of the secondary of the transformer connected to phase 2.

Curve C'I'F' represents the open circuit voltage of the secondary of the transformer connected to phase 3.

Curves A'J'D', B'K'E' and C'L'F' represent the voltage under load of the three secondaries.

Points M', N' and O' represent the striking point of the respective lights.

Lines M'J'P', N'K'Q' and O'L'R' represent the voltage of the respective lights during the period of illumination.

It will be noted that the phases are 120° apart and that there is an appreciable time after the first light goes out before the next light strikes. The frequency of flashes is the same as the frequency of the alternating source and the duration of the flash is about one-fourth of a cycle.

More detailed information as to transformer design and methods of adjustment will be found in the description of Figure 3. Instead of a separate transformer being used at each light one central three phase transformer may be used and each light or group of lights connected to one of the phases. This central transformer may have either a Y or delta arrangement.

In Figure 6 is shown an arrangement which may be used with direct current as the source of energy for the lights 42 and 43. The rotating arm 19 is connected to one side of the D. C. supply circuit and successively make electrical contact with segments 20 and 21 which are connected through resistances 44 to lights 42 and 43. The other side of the D. C. supply is connected to the other terminal of the lights.

The arm 19 may be driven by a synchronous motor or may be mechanically connected to the camera driving mechanism.

In Figure 7 it is shown diagrammatically the wave forms of the voltage which will be obtained by adjustments of transformers and resistances under load and no load condition and the means of adjustment whereby the timing of light flash duration can be secured. In Figure 7 the line $O^2P^2$ is the time axis and for this purpose I shall consider the frequency 60 cycles. $O^2P^2$ therefore will be 1/120 second.

Line $E^2G^2$ represents the voltage level necessary to strike the arc.

Line $F^2S^2$ represents the voltage level at which the arc will go out.

Curve $A^2$ represents one value of no load voltage.

Curve $B^2$ represents a second value of no load voltage.

Curve $C^2$ represents one value of load voltage.

Curve $D^2$ represents a second value of load voltage.

The values in all cases are those which will occur at the light terminals.

I shall first consider the longest light flash which will occur with the circuit adjustments conforming to the values of curves $A^2$ and $C^2$. The light will strike when the voltage rises along curve $A^2$ to the point $E^2$. When the light strikes, the voltage will immediately fall to the point $T^2$ on curve $C^2$. With the light burning, the voltage will then follow curve $C^2$ to the point $S^2$ at which point the light will go out. The voltage will then rise to the point $U^2$ on curve $A^2$ which is lower than the level $E^2G^2$, the light will therefore not restrike. The voltage will then follow the curve $A^2$ to point $P^2$ representing zero voltage. The duration of the flash is represented by the length of the line $N^2V^2$ which will be less than 1/120 of a second by an amount depending on the steepness of the curves $A^2$ and $C^2$.

I will now consider a flash of short duration which will occur with the circuit adjusted to conform to curves $B^2$ and $D^2$.

In this case the voltage will rise along the curve $B^2$ from zero to the point $I^2$ at which point the light will strike. The voltage will then fall to the point $L^2$ on curve $D^2$. With the light burning the voltage will follow curve $D^2$ to point $H^2$ at which point the light will go out. The voltage will then rise to the point $Y^2$ on curve $B^2$ which is at a level below $E^2G^2$ therefore the light will not restrike. The voltage will then follow curve $B^2$ to point $P^2$ or zero. In this case, the duration of the flash is represented by the line $Z^2R^2$ which is shorter than line $N^2V^2$.

If the peak of curve $B^2$ is made to fall at the intersection of $E^2G^2$ and the center line and the peak of curve $D^2$ is made to fall at the intersection of lines $F^2S^2$ and the center line the duration of the flash will be infinitesimal. By so adjusting the circuit that the peak of either curve rises above either $E^2G^2$ or $F^2S^2$ respectively, the duration of the flash may be controlled.

From the foregoing it can be seen that the maximum duration of flash can be made to approximate one half the frequency of the current source and minimum duration can be made infinitesimal. It is obvious that any intermediate adjustment is possible.

In a two color system for taking motion pictures, it is desirable that the two pictures either be taken simultaneously or sufficiently close together that motion fringe or color fringe will not appear, and that the pictures be taken through the same lens to avoid parallax. The same applies with greater force to a three color system. It has not been possible in the past to secure sufficient illumination to make three color separations consecutively at a sufficiently high speed to eliminate the fringing.

When carbon arcs or incandescent lights are used and colored filters are employed at the camera, the full radiation of the lights strikes the performer with a most uncomfortable heating. By using the proper filters at the lights the heat rays may all be absorbed and only the rays necessary for the proper color separation allowed to strike the performer. Filtering at the camera then becomes unnecessary and a sufficient illumination may be supplied without causing undue heating. This is especially true if gas arc lights are employed such as mercury or neon.

Without adding costly and complicated apparatus to the camera consecutive exposures will have the same timing and it is therefore essential that the illumination for each of the colors be balanced with respect to the emulsion of the film stock used.

I have found that by using the proper number, spacing and intensity of lights for each of the respective colors, I am able to make balanced color separation negatives by employing the same time of exposure for each color and this same condition applies for any desired choice of filters.

With a modern high speed lens and fast panchromatic emulsions, I have no difficulty in securing satisfactory negatives with exposures as short as 1/500 of a second.

Present practice is to expose 24 frames a second of standard 35 mm. film, the film running at a rate of 90 feet a minute. Certain of the present commercial types of cameras will run as fast as 80 frames a second or 300 feet a minute.

By employing my methods of illumination and synchronization, it is possible for me to take three color separation frames in the time now consumed in taking one neutral colored frame and by projecting positives made from these negatives with proper filters an accurate additive colored picture results.

To accomplish the proper results the light flashes must start at a definite time with relation to the camera and must also stop at a definite time with a dark period between flashes during which dark period a new unexposed surface of film can be brought into registration in the camera. I obtain this result by choosing the proper characteristics for the power supply for the lights. I will take the three color system as an example, but the description is equally applicable to a polycolor system.

The camera is driven by a synchronous motor which is geared to it so that for each half-cycle a new frame of the sensitive film will be pulled down into registration.

During the period of motion of the film, the camera shutter is closed, but after the film stops, the shutter opens. Reference is now made to Figure 5. At the point W' on the time axis A'F" the camera shutter is closed and there is no light. During the period of time represented by the line W'D' on time axis the film is in motion. At time D' the light connected to phase two strikes and at this point or shortly thereafter, the film comes to rest and the camera shutter opens.

Light is then reflected from the object to the sensitive film from the time D' to time X' or shortly therebefore. At approximately time X', the camera shutter should close and the film start moving to the next frame coming to rest at approximately time E' at which point the light connected to phase three strikes. At approximately time E' the camera shutter again opens and exposure is made for the time E'Y'. The process is then repeated through phase one and so on through each of the phases in turn.

In the preferred embodiment of my invention, it is my intention that a type of light should be used which in itself rectifies as for example the mercury arc or hot cathode neon arc but if a light is used which does not rectify a suitable rectifier may be inserted in series with the light as for example a tungar tube.

The mercury or hot cathode neon arcs will respond without difficulty to frequencies as high as 1000 per second and with this class of lights no difficulty will be encountered if they are operated below the point of incandescense of the container and electrodes. If lights such as carbon arcs or hot filament incandescents are used, it is necessary to provide a mechanical shutter which will operate synchronously with the camera and the same results will be secured. The design of this shutter will depend upon the size and shape of the lamp housing or reflector but such shutter can easily be constructed by one versed in the art.

The filters necessary to give correct color separation on a well known make of panchromatic film multiplies the exposures necessary to secure fully timed negatives four times for the red, four times for the green and twenty-five times for the blue. To obtain a full time blue separation negative it is therefore essential to use 25 times as much illumination as would be used for a black and white. To obtain a proper balance about ⅛ of the blue exposure is given for the red and green separations.

The heating caused by a sufficient number of incandescent lights to give full exposure with no filter is uncomfortable at camera speeds of 16 frames per second, and it is unbearable at a speed of 48 frames per second which is the speed necessary to avoid color fringes.

If the already unbearable illumination is multiplied twenty-five times in order to properly expose for a blue separation, the limit of practicability has been surpassed, because the required illumination is seventy-five times greater than that necessary for a black and white at sixteen frames per second. This is the factor which up to this time has made impractical a truly additive three color motion picture system. My invention overcomes this difficulty.

In the preferred embodiment of my invention, I use lights which emit relatively low amounts of heat rays, I insert filters at the lights which absorb heat rays and I choose for each color a light, a major portion of the emission of which is of the desired color. Approximately 60% of the emission of a mercury arc in the visible spectrum is blue. The transmission of a proper tricolor blue filter averages about 30% for blue light, but only about 1% for total transmission of white light. I therefore require about $\frac{1}{10}$ the candlepower of photochemical blue light or $\frac{1}{30}$ the candlepower in mercury arcs that would be required with a white light source.

About 20% of the visible light emitted by the mercury arc is in the greenish part of the spectrum. The transmission of a proper tricolor green filter averages over 60% for green light with a total transmission of about 30%. I therefore require five times the candlepower of mercury lights than would be required with a white light source.

About 90% of the visible light emitted by the neon arc is in the red part of the spectrum. The transmission of a proper tricolor red filter averages over 60% for red light with a total transmission of 6% for white light. I therefore require about $\frac{1}{10}$ the candlepower of photochemical red light or $\frac{1}{6}$ the candlepower in neon arcs than would be required with a white light source.

Practically all infra red or heat rays are absorbed by the blue and green filters which are used with the mercury light and the necessary candlepower of the neon arc is so low that the heat emitted is not objectionable, but a liquid filter may be used to absorb the heat rays if desired. I have determined experimentally that these values are sufficiently accurate for the purpose of this description.

It is obvious that the total amount of candlepower which I require for my three color system is materially less than is used in present known methods and that I effect a saving in costs and gain a decided advantage in elimination of heating. The practicability of my invention can readily be seen from the following.

On the assumption that an illumination from 10,000 candlepower will give a proper exposure regardless of color, a 1,000,000 candlepower source of white light will be required for the blue exposure, the total transmission of the filter being 1%, I shall require 55,000 candlepower of mercury arcs.

A 33,000 candlepower source of white light will be required for the green exposure the total transmission of the filter being 30%; I shall require 165,000 candlepower of mercury arcs.

A 165,000 candlepower source of white light will be required for the red exposure, the transmission of the red filter being about 6%; I shall require 18,500 candle power of neon arcs.

The total white light requirement is determined by the blue exposure or is 1,000,000 candlepower. My total requirement is the sum of the three or 238,500 candlepower, which is about ¼ of the white light required. The efficiency of neon and mercury arcs taken in lumens per watt compares favorably with other lights, I therefore effect a saving of about 75% in the power consumed.

According to present practice the procedure is to either take a group of two or more pictures simultaneously in which case the positives or transparencies are tinted in the proper color and combined into one picture, or to take the separately colored pictures consecutively and project the positives consecutively through the proper color filters. Other methods using more than one camera lens are well known, but are not satisfactory due to the fact that parallax always results. Processes which involve tinting of the positive film are costly and those in which consecutive exposures are employed are not free from color striping.

It has always been found that additive color processes give more correct color rendering than subtractive processes, but they have not, heretofore, been free of fringing and striping.

Starting with the assumption that at a speed of 16 frames per second there will be no objectionable flicker, which assumption is based on the fact that this speed has been found to be satisfactory, it is found that regardless of shutter speed, each consecutive frame will be a reproduction of the object in its position after a lapse of $\frac{1}{16}$ second. These consecutive frames do not, except in the case of still objects, reproduce the object in the same position. The shutter speed must be such that each individual picture will be sharp and clearly defined. If we now consider a moving object, the color of which is a mixture of two or more colors, for example red and green, and there is made an exposure for red on frame number one, and for green on frame number two, the two images will be displaced by an amount depending on the distance the object will have moved in $\frac{1}{16}$ of a second.

If the two images were exactly in register, the red and green lights would mix to produce a yellow; but if they are not exactly in register stripes will appear which will be at right angles to the direction of motion, a red stripe on the following edge and a green stripe on the leading edge, and the width of this stripe will depend on the distance the object has moved between exposures.

It is obvious that if consecutive exposures are made at a sufficiently short interval, the striping can be reduced to a point where it no longer is objectionable. For motion of average moderate rapidity a shutter speed of 1/80 second will result in a sharp image, and therefore if a group of color separation exposures are made, each frame being spaced 1/160 second for two color and 1/240 second for three color, no objectionable fringe will result.

By the method hereinbefore described, it is possible to take color pictures at this speed. This speed is much greater than necessary for motion pictures in neutral tone and would be excessive for the present commercial types of projectors.

But there are alternatives which overcome these difficulties. The first alternative is to skip print, that is omit from the positive 14 groups of pictures between each group printed. Each consecutive group on the positive so prepared will give the position of the object at intervals of 1/16 second and the projector speed will be 48 frames per second which is not prohibitive due to the fact that at speeds above 16 per second projector flicker is not noticeable it will be found that where the motion of the object is not too rapid the skip printing can be carried out by omitting 29 groups of pictures for each group printed in which case the position of the object will be reproduced at 1/8 second intervals and the projector speed be 24 frames per second which is the present standard.

The foregoing is based on three color separations in each group. If each group consists of two color separations the skip printing can be carried out so that the position of the object is reproduced at 1/12 second intervals and a projector speed of 24 frames per second.

There are now available commercial cameras which operate at higher speeds than 240 per second. These cameras are equipped with lenses of large aperture and contemplate the use of very sensitive negative film. At a speed of 240 frames per second the actual time of exposure is of the order of 1/500 second and this speed although high has been found to be practical.

Although the first alternative described above wastes negative film, this is not serious as the cost of this film is not excessive. This waste may be eliminated by the adoption of my second alternative which necessitates the use of a special camera.

I will describe the camera as adapted to three color work, but its design for two color work will be obvious from the description.

If it is determined that each group of three pictures shall reproduce the object at essentially one position and succeeding groups reproduce the object at its position after an intervening interval of 1/16 second; the mechanism of the camera must be arranged so that the first three consecutive exposures be made at a rate of 240 frames per second; then 1/16 second be permitted to elapse and the second group of exposures made at a rate of 240 frames per second and so on. It is beyond the scope of this specification to describe the mechanical design of such a camera.

There is a third alternative which also requires a special camera. In this alternative the camera is arranged to pull down three frames at a time at a predetermined rate. During the interval that the three frames are at rest, the optical system changes so that the image is first focused on frame 1 then on frame 2 and then on frame 3, the shutter then closing and the next group of three frames being pulled down and the exposures made as before.

In the place of the latter camera in which the three frames are arranged lengthwise on the strip, a wide film may be used and the frames arranged side by side. Wide film may be projected or printed longitudinally.

In the foregoing, I have pointed out the essential principles as to speed, adherence to which is necessary to produce natural color pictures. First the projector must run at a speed high enough to eliminate flicker, second the time interval between each of the three color pictures must be small enough to eliminate striping.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In a device for producing motion pictures in colors, the combination of a source of single phase alternating current, a pair of different colored self-rectifying light sources connected in reverse polarity to the source of current.

2. In a device for producing motion pictures in colors, the combination of a polyphase source of alternating current, a transformer, and a plurality of different colored self-rectifying light sources, each of said light sources being connected to separate phase windings of the transformer.

3. A device for synchronizing the energization of a plurality of different colored self-rectifying lights with a camera, comprising a source of polyphase alternating current, a transformer, each of said lights being connected to separate phase windings of the transformer, a synchronous motor connected to the source of current, and means for connecting the motor to a camera to cause an exposure during the flash of each light.

4. A device for synchronizing the energization of three different self-rectifying light sources with a camera having a constantly rotating shutter, comprising a source of three-phase alternating current, a delta connected transformer, each of said light sources being connected in series with a secondary winding of the transformer, a three-phase synchronous motor, and means for operating the camera shutter by the motor to cause an exposure during the flash of each light.

5. A device for synchronizing the operation of a plurality of successively energized self-rectifying devices with a constantly moving device, comprising a source of polyphase alternating current, a transformer, each of said successively energized devices being connected to separate phase windings of the transformer, a synchronous motor connected to the source of current, and means for operating the constantly moving device by the motor.

6. A device for synchronizing the energization of three different self-rectifying light sources with a camera having a constantly rotating shutter, comprising a source of three-phase alternating current, a three-phase transformer, each of said light sources being connected in series with each secondary winding of the transformer and a variable resistance, a three-phase synchronous motor, and means for operating the camera shutter by the motor to cause an exposure during the flash of each light.

ISAAC P. RODMAN.